(12) United States Patent
Alexander

(10) Patent No.: US 12,488,209 B2
(45) Date of Patent: Dec. 2, 2025

(54) TRACKER KEEPSAKE SYSTEM AND METHOD OF USE THEREOF

(71) Applicant: Christina Alexander, Victoria (CA)

(72) Inventor: Christina Alexander, Victoria (CA)

( * ) Notice: Subject to any disclaimer, the term of this patent is extended or adjusted under 35 U.S.C. 154(b) by 84 days.

(21) Appl. No.: 18/664,882

(22) Filed: May 15, 2024

(65) Prior Publication Data

US 2024/0412017 A1    Dec. 12, 2024

(30) Foreign Application Priority Data

Jun. 6, 2023    (CA) ................. CA 3202235

(51) Int. Cl.
*G06K 7/14* (2006.01)
*B65D 33/00* (2006.01)

(52) U.S. Cl.
CPC ......... *G06K 7/1417* (2013.01); *B65D 33/004* (2013.01); *G06K 7/1413* (2013.01)

(58) Field of Classification Search
CPC .............. G06K 7/1417; G06K 7/1413; G06K 19/06103; G06K 19/06028; B65D 33/004
USPC .................... 235/462.1, 462.09, 462.07, 375
See application file for complete search history.

(56) References Cited

U.S. PATENT DOCUMENTS

| | | | |
|---|---|---|---|
| 7,665,195 B1 * | 2/2010 | Vazquez-Perez | A61G 17/08 27/1 |
| 9,200,469 B1 * | 12/2015 | Mindrum | E04H 13/003 |
| 9,465,812 B1 | 10/2016 | Robinson | |
| 11,544,685 B2 | 1/2023 | Stern | |
| 2008/0083102 A1 * | 4/2008 | Johnson | E04H 13/008 27/1 |
| 2011/0154626 A1 * | 6/2011 | VanDenBogart | A61G 17/08 493/320 |
| 2011/0191993 A1 * | 8/2011 | Forrest | A61G 17/007 27/1 |
| 2013/0204865 A1 | 8/2013 | Deluca | |
| 2014/0065252 A1 * | 3/2014 | Cooke | A01L 11/00 425/2 |
| 2014/0218519 A1 * | 8/2014 | Borovinov | A61G 99/00 27/1 |
| 2016/0275103 A1 * | 9/2016 | Robinson | G06Q 10/087 |
| 2017/0330162 A1 * | 11/2017 | Stern | G06F 3/165 |
| 2022/0180074 A1 | 6/2022 | Llewelyn | |
| 2022/0316229 A1 * | 10/2022 | Griggs | E04H 13/008 |
| 2025/0036708 A1 * | 1/2025 | King | G06F 16/9554 |
| 2025/0231998 A1 * | 7/2025 | Labrecque | H04L 63/08 |

FOREIGN PATENT DOCUMENTS

EP    1226846    8/2005
EP    3106588 B1 *    8/2020 ............. A61G 99/00

* cited by examiner

*Primary Examiner* — Edwyn Labaze
(74) *Attorney, Agent, or Firm* — Baumgartner Patent Law, LLC; Marc Baumgartner

(57) ABSTRACT

A keepsake package is provided for use with a mobile computing device, the keepsake package comprising a sachet, a biodegradable keepsake which is releasably retained in the sachet and a scannable code which is linked directly or indirectly to a navigation application website that is specific to a deceased person or deceased pet.

2 Claims, 2 Drawing Sheets

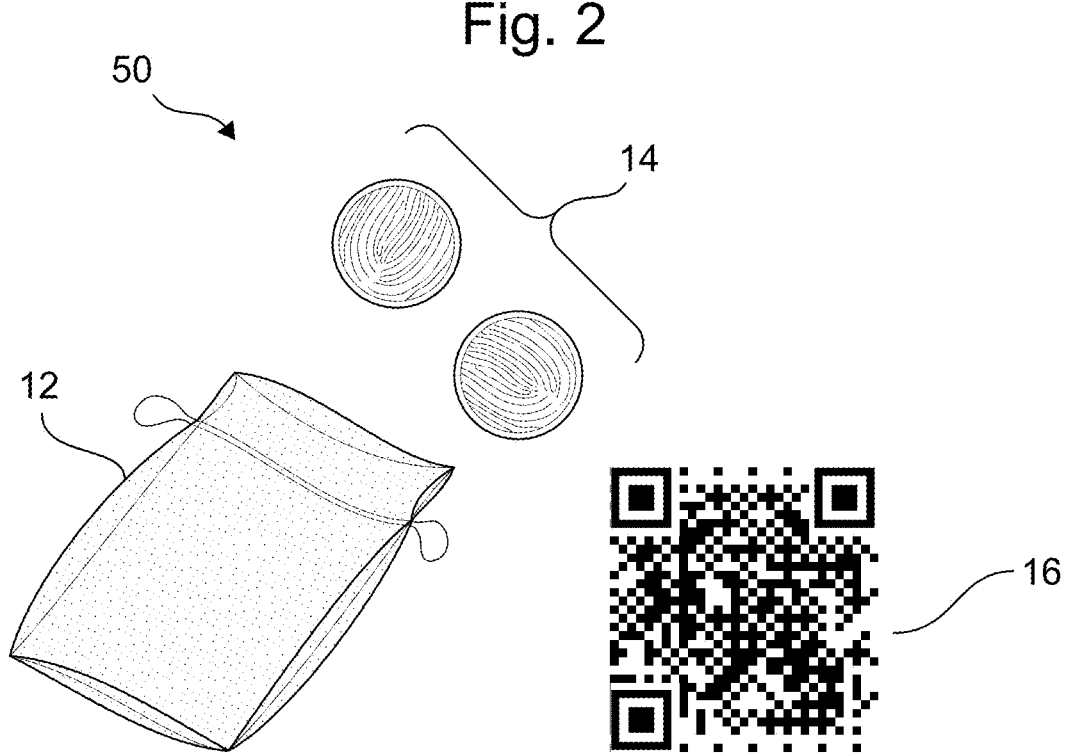
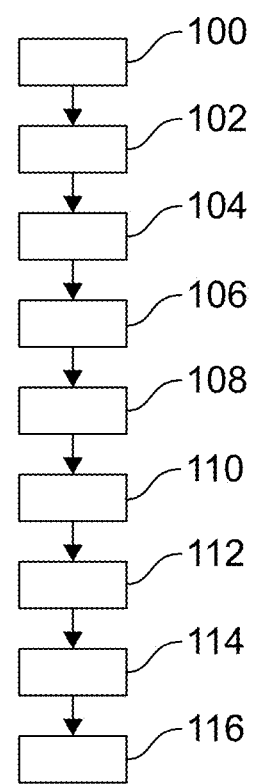

TRACKER KEEPSAKE SYSTEM AND METHOD OF USE THEREOF

CROSS REFERENCE TO RELATED APPLICATIONS

The present application claims benefit of Canadian Patent Application Serial No. 3202235, filed on Jun. 6, 2023, entitled TRACKER KEEPSAKE SYSTEM AND METHOD OF USE THEREOF, the contents of which are incorporated herein by reference.

FIELD

The present technology relates to a memorial keepsake and a location tracker for friends and relatives of the deceased. More specifically, it is a combination of a memorial keepsake and a scannable code for accessing a navigation application to provide the location of the memorial keepsake.

BACKGROUND

There are many ways to remember a deceased person with a keepsake. For example, U.S. Pat. No. 11,544,685 discloses a multimedia keepsake that is created containing multimedia content created by a customer and stored online as content information. After the customer selects the type of keepsake, the content information is converted to keepsake information having a format appropriate for storage in the selected type of keepsake. The keepsake information is stored online so as to be accessible via an access code, and it is downloaded to a vendor providing the access code.

United States Patent Application Publication No. 20220180074 discloses a wearable device with an embedded keepsake, said apparatus comprising at least a transparent enclosure forming a keepsake housing; said housing filled with a pulverized expression of the keepsake for display via the transparent housing; and the filled keepsake housing embedded within any portion of the wearable device.

United States Patent Application Publication No. 20130204865 discloses a durable memento system that enables the storage of data associated with mementos, which are objects that serve to provide a reminder of a person, place, thing, or an event. Embodiments are configured to store and recall data including but not limited to pictures, movies, sounds, text, or other information such as performance data indirectly associated with a memento such as but not limited to a keepsake, souvenir, gift, gift card, medal or award, tool or any combination thereof. One or more embodiments may include a visual and/or machine-readable and/or human-readable code to associate the data with the memento. The durable data may be stored remote from the memento, which prevents obsolescence by securing data robustly. This enables the data to be accessed years later even if the file formats or display technology for the data has changed by that time and even if the original memento has been lost.

European Patent Application EP1226846 discloses a system that creates a record of an activity that involves a route including visits to a plurality of locations. The record is of an aesthetic appeal and useful for recording the specifics of the activity. The participant of the activity carries a recording device that records the coordinates of locations visited. This information is downloaded to a processing computer, and a keepsake is created.

What is needed is a system that includes a keepsake for leaving in a location of significance to the deceased and a means for identifying that location for others to see. It would preferably include a scannable code which would be linked, directly or indirectly to a navigation application website that is specific to the deceased. It would preferable include a carrying container. The carrying container would preferably be small. The keepsake would preferably be small and biodegradable.

SUMMARY

The present technology is a system that includes a keepsake for leaving in a location of significance to the deceased and a means for identifying that location for others to see. It is a scannable code which is linked, directly or indirectly to a navigation application website that is specific to the deceased. It includes a carrying container. The carrying container is small, and in one embodiment is a sachet. The keepsake is small and biodegradable.

In one embodiment, a keepsake package is provided for use with a mobile computing device, the keepsake package comprising a container, a keepsake which is releasably retained in the container and a scannable code which is linked directly or indirectly to a navigation application website that is specific to a deceased person or deceased pet.

In the keepsake package, the keepsake may be biodegradable.

In the keepsake package, the container may be a sachet.

In the keepsake package, the keepsake may be an embossed disc.

In the keepsake package, the embossed disc may be embossed with a fingerprint of the deceased person.

In the keepsake package, the embossed disc may be clay.

In the keepsake package, the keepsake may be a memento.

In the keepsake package, the memento may be a shaped article.

In the keepsake package, the memento may be a substrate with one or more of a painting, a drawing, a stamp or an etching thereon.

In the keepsake package, the memento may comprise one of wood, dried and pressed plant material and clay.

In the keepsake package, the memento may comprise wood or dried and pressed plant material.

In another embodiment, a method of tracking a keepsake is provided, the method comprising: a user selecting the keepsake package as described above; the user traveling to a selected location with the keepsake package and a mobile computing device; the user scanning the scannable code with the mobile computing device; and in any order, the user removing the keepsake from the container, the user photographing the keepsake at the selected location to provide a photograph, the user downloading the navigation application website that is specific to a deceased person or deceased pet; the user uploading the photograph; and the user entering coordinates of the selected location on the navigation application website that is specific to the deceased person or deceased pet.

The method may further comprise the user leaving the keepsake at the selected location.

In another embodiment, a keepsake tracker system is provided, the keepsake tracker system comprising: a mobile computing device, which includes a navigation application website that is specific to a deceased person or deceased pet; and a keepsake package, the keepsake package including a container, a keepsake which is releasably retained in the container and a scannable code which is linked directly or indirectly to the navigation application website that is specific to a deceased person or deceased pet on the mobile computing device.

In the keepsake tracker system, the keepsake may be biodegradable.

In the keepsake tracker system, the container may be a sachet.

In the keepsake tracker system, the keepsake may be an embossed disc.

In the keepsake tracker system, the embossed disc may be embossed with a fingerprint of the deceased person.

In the keepsake tracker system, the embossed disc may be clay.

In the keepsake tracker system, the keepsake may be a memento.

In the keepsake tracker system, the memento may be a shaped article.

In the keepsake tracker system, the memento may be substrate with one or more of a painting, a drawing, a stamp or an etching thereon.

In the keepsake tracker system, the memento may comprise one of wood, dried and pressed plant material and clay.

In the keepsake tracker system, the memento may comprise wood or dried and pressed plant material.

BRIEF DESCRIPTION OF THE DRAWINGS

FIG. 2 is a schematic of the keepsake package of FIG. 1.

FIG. 3 is a flow chart of the method of using the marketable combination of FIG. 1, with a user's mobile computing device.

DETAILED DESCRIPTION OF THE INVENTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
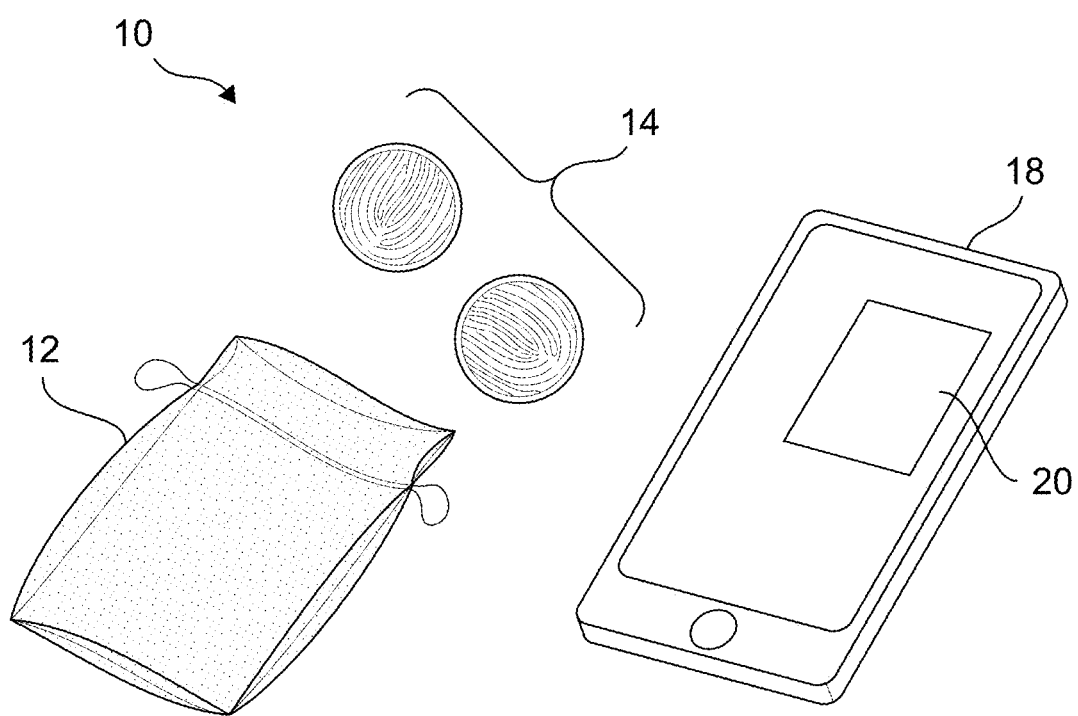
FIG. 1 is a schematic of the tracker keepsake system of the present technology.
Figure 1:

A trackable keepsake system, generally referred to as 10, is shown in FIG. 1. It includes a sachet 12, a physical keepsake 14, a scannable code 16, a mobile computing device 18 with an application 20 thereon, with instructions and a link to a navigation application website, for example, Google Earth®. In one embodiment, the sachet 12 is replaced with a box or another suitable small container. In one embodiment the keepsake 14 is one embossed disc. In another embodiment the keepsakes 14 are two embossed discs. In another embodiment there are three or more keepsakes 14. In one embodiment, the keepsake 14 is embossed with the fingerprint of the deceased person. In another embodiment, the keepsake 14 is embossed with an article that is representative of the deceased person. The keepsakes 14 are tangible and made of a biodegradable or natural substance, for example, but not limited to clay or rock. In an alternative embodiment, the keepsake 14 is a memento that is representative of the deceased person. In one embodiment, the memento is tangible and may be, but not limited to, the shape of a boat, an anchor, a fishing lure, a bicycle, a frying pan, binoculars, a camera, or other shaped articles. The memento is made of a biodegradable or natural substance for example, but not limited to, clay, dried and pressed plant material, leather or wood. In one embodiment, the memento may be, for example, but not limited to a biodegradable or natural substrate that is painted, stamped, etched or drawn on with a shape that is representative of the deceased. In one embodiment the scannable code 16 is a quick response (QR) code. In another embodiment, the scannable code 16 is an Aztec code. In another embodiment, the scannable code 16 is a bar code.

The scannable code 16 is linked to a navigation application page that is specific to the deceased. In one embodiment, the scannable code is directly linked to the navigation application file that is specific to the deceased. In another embodiment, the scannable code is linked to a first page, which may be an instruction page, which in turn is linked to the navigation application page that is specific to the deceased. The instructions may include instructions for uploading photographs of the site that the user has chosen to leave the keepsake 14. The instructions may include instructions for writing a short note explaining the importance of the location that the user selected and why it reminded the user of the deceased. The instructions may also include an email address to which the photographs and the short note can be sent to. The instructions may include instructions for identifying the geolocation of the photograph wherein the keepsake 14 is being left.

As shown in FIG. 2, the marketed combination, which is a keepsake package 50, includes the sachet 12, the keepsake 14 and the scannable code 16. It is for use with a user's mobile computing device 18.

As shown in FIG. 3, a friend or family member of the deceased travels 100 with the sachet 12 holding the keepsake to a location that they feel was significant to the deceased. A significant location is not the location where the deceased is interred. The friend or family member removes 102 the keepsake 14 from the sachet 12 and photographs 104 the keepsake at that location. The friend or family member scans 104 the scannable code 16. The scannable code 16 links 106 to an instruction page which links 108 to a navigation application website that is specific to the deceased. Alternatively, the scannable code 16 links 110 directly to the navigation application that is specific to the deceased. The friend or family member downloads 112 the navigation application website that is specific to the deceased; the user uploads the geolocation 114 onto the navigation application that is specific to the deceased. The friend or family member also uploads 114 the photograph or photographs. The friend or family member also uploads 116 a few words describing the location and the significance they feel it has. The keepsake 14 is left at the selected site, which is not the location that the deceased is interred. The friend or family member optionally emails the master of the navigation application site. Other friends and family members can view the map and see the entry. An example of such a map can be seen at:

https://sites.google.com/view/tristansfingerprinttravels/home

In one embodiment, the person who places a keepsake in a location sends an email to the email address of the master of the navigation application website. The email contains the longitude and latitude coordinates of the keepsake along with any comments or memories they may wish to share and also any photos that they have taken while placing the keepsake.

When the master of the navigation application website receives an email, they log into the Google Earth and add a new keepsake location using the coordinates provided by the person who has sent the email. When the master of the navigation application website pins the location onto Google Earth, they are also able to add the person's written comments and their photos.

In another embodiment, a geo tag is embedded into the keepsake. When activated, the geo tag automatically appears on the Google Earth. The person who has placed the keepsake can share photos and written memories or comments through a sharing application on a computing device. be added to the location pin on the Earth.

In an alternative embodiment, the deceased may be a pet.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A method of tracking a keepsake for a deceased person or a deceased pet that is interred in an interment location, the method comprising: a user selecting a location which is other than the interment location to provide a selected location; the user selecting a keepsake package comprising a container, a keepsake which is releasably retained in the container and a scannable code which is linked directly or indirectly to a geolocation navigation application website page which is specific to a single deceased person or a single deceased pet; the user traveling to the selected location with the keepsake package and a mobile computing device; the user scanning the scannable code with the mobile computing device; and the user removing the keepsake from the container, the user photographing the keepsake at the selected location to provide a photograph of the keepsake in the selected location, or the user first downloading the geolocation navigation application website page is configured to record a geolocation corresponding to the selected location of the keepsake package; the user uploading the photograph; and the user entering geolocation coordinates of the selected location on the geolocation navigation application website, thereby tracking the keepsake.

2. The method of claim 1, further comprising the user leaving the keepsake at the selected location.

* * * * *